March 10, 1964 J. H. DRILLICK 3,124,303
SELECTIVELY OPERABLE POWER TRANSMISSION DEVICE
Filed April 12, 1961 3 Sheets-Sheet 1
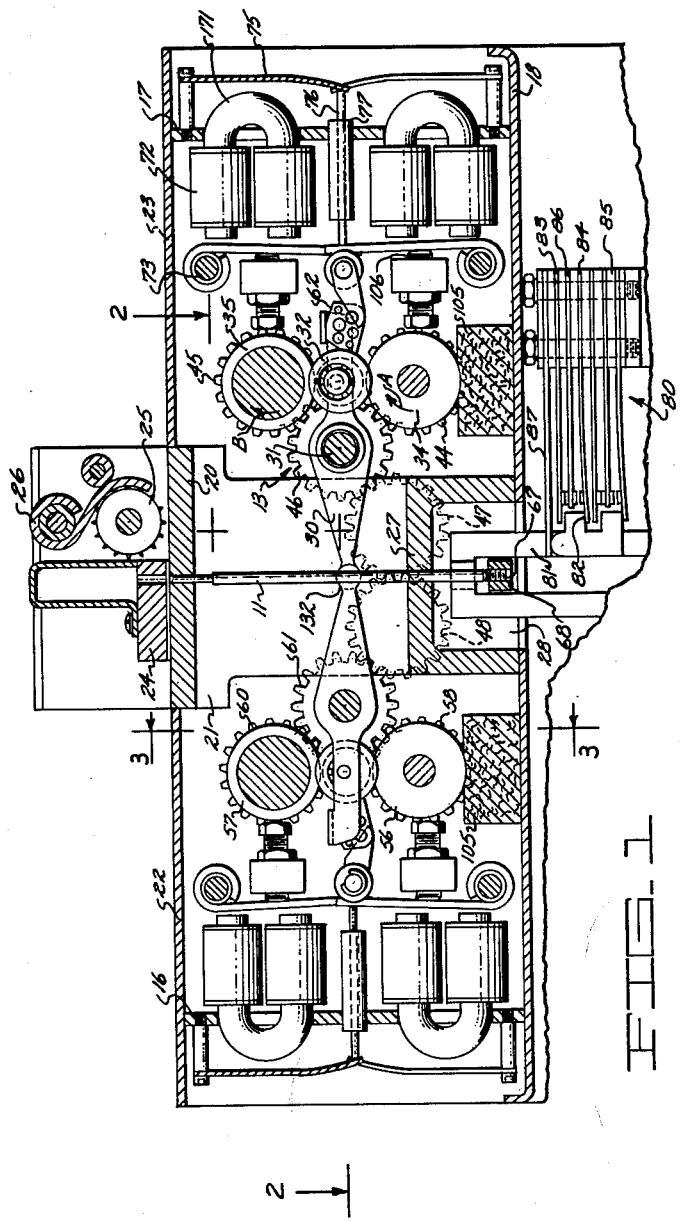
INVENTOR.
JACOB H. DRILLICK
BY
ATTORNEY March 10, 1964 J. H. DRILLICK 3,124,303
SELECTIVELY OPERABLE POWER TRANSMISSION DEVICE
Filed April 12, 1961 3 Sheets-Sheet 2
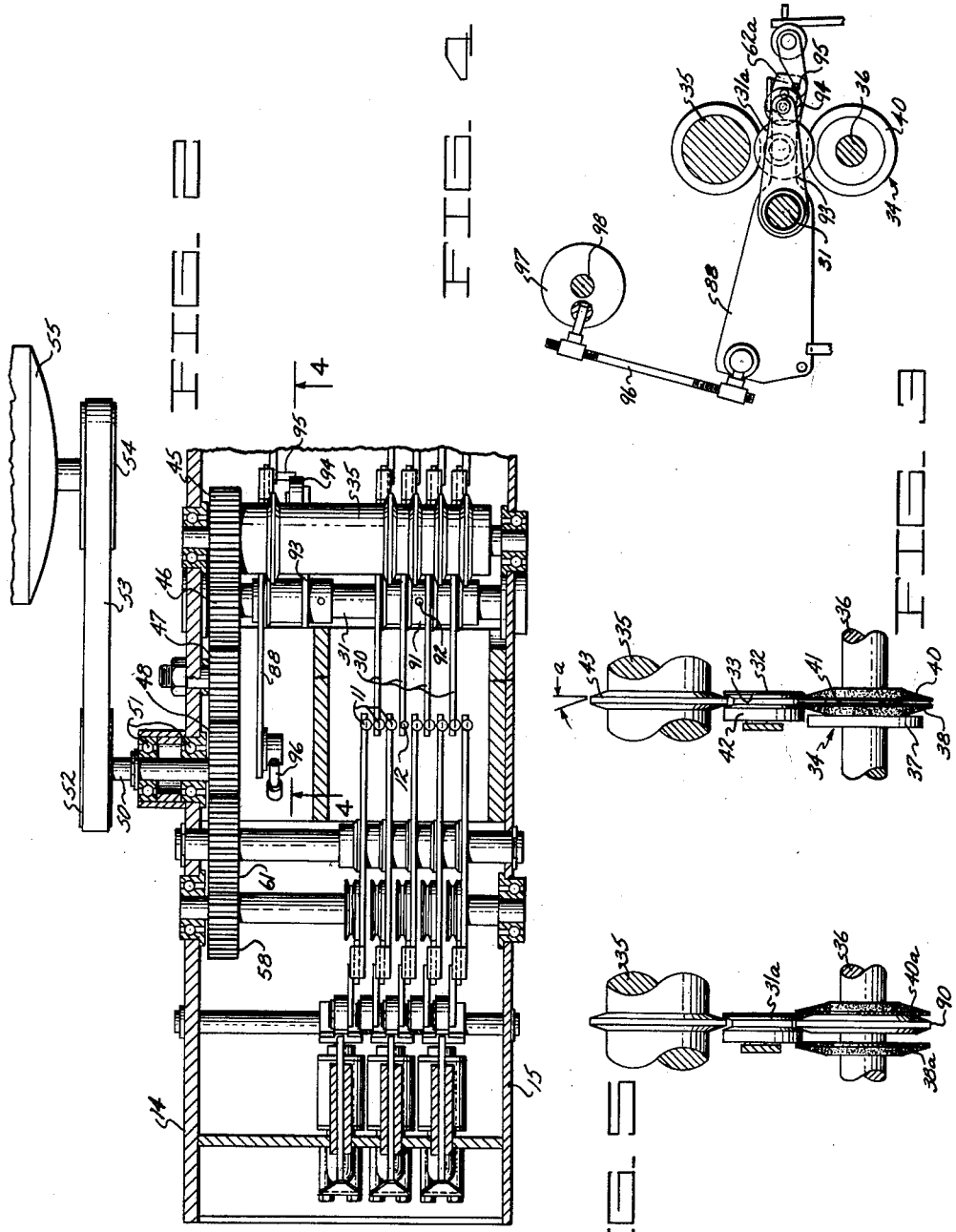
INVENTOR.
JACOB H. DRILLICK
BY
ATTORNEY March 10, 1964 J. H. DRILLICK 3,124,303
SELECTIVELY OPERABLE POWER TRANSMISSION DEVICE
Filed April 12, 1961 3 Sheets-Sheet 3

INVENTOR.
JACOB H. DRILLICK
BY
ATTORNEY

United States Patent Office 3,124,303
Patented Mar. 10, 1964

3,124,303
SELECTIVELY OPERABLE POWER
TRANSMISSION DEVICE
Jacob H. Drillick, Granada Hills, Calif., assignor, by
mesne assignments, to Clary Sales & Supply Corporation, San Gabriel, Calif., a corporation of California
Filed Apr. 12, 1961, Ser. No. 102,526
14 Claims. (Cl. 234—107)

This invention relates to actuating devices and has particular reference to actuating devices capable of extremely high speed and quick response to control impulses.

High speed electromagnetically controlled punches for perforating paper tape and other forms of record media are examples of such actuating devices, and are generally either of the synchronous or the asynchronous type.

The synchronous type punches generally comprise a continuously oscillating or reciprocating actuator to which one or more punches are coupled by individual electromagnetic devices when the actuator reaches one limit of its travel. The tape is automatically advanced when the actuator reaches another point of its travel.

The asynchronous type punches generally comprises a drive mechanism for a plurality of punches, which drive mechanism is selectively clutched to a continuously operating prime operator for one cycle at a time, concurrently with the coupling of one or more punches to the drive mechanism. Such clutching may occur at any time.

Although the asynchronous type punch is inherently faster in that it can be operated immediately upon reception of a control signal or impulse, those asynchrous punches of which applicant is aware involve considerable mass which restricts their speed of operation. For example, in most cases, the clutch must drive a main drive mechanism for all of the punches regardless of the number of punches coupled to such main drive at any one time.

It therefore becomes a principal object of the present invention to provide an improved asynchronously operable actuator for tape punches or the like which is instantaneously responsive to a control signal.

Another object is to minimize the length of travel of the parts of an actuator of the above type.

Another object is to provide an actuator of the above type which, when actuated, is driven through a complete oscillating stroke.

Another object is to provide a fricitonally driven asynchronously operable actuator of the above type.

Another object is to provide a high speed actuator of the above type having a minimum mass and consequent minimum inertia and momentum.

Another object is to provide a high speed actuator of the above type which is normally restrained against a constant frictional drive and which is released to operate through an operating stroke.

Another object is to provide a high speed record media punch wherein various punches are individually clutched to a constantly driven drive member upon reception of respective control signals.

Another object is to provide a simple and economically manufactured high speed actuator for record media punches or the like.

The manner in which the above and other objects of the invention are accomplished will be readily understood on reference to the following specification when read in conjunction with the accompanying drawings, wherein:

FIG. 1 is a longitudinal section view through a tape punch unit embodying a preferred form of the present invention.

FIG. 2 is a sectional plan view of the punch unit and is taken substantially along the line 2—2 of FIG. 1.

FIG. 3 is an enlarged end view taken substantially along line 3—3 of FIG. 1 illustrating part of the actuator unit for driving one of the punches through its stroke.

FIG. 4 is a section view illustrating the actuator unit for the tape feed mechanism.

FIGS. 6 to 9 are diagrammatic views illustrating the different positions assumed by each of the punch actuator units during actuation of a respective punch.

Figure 5:
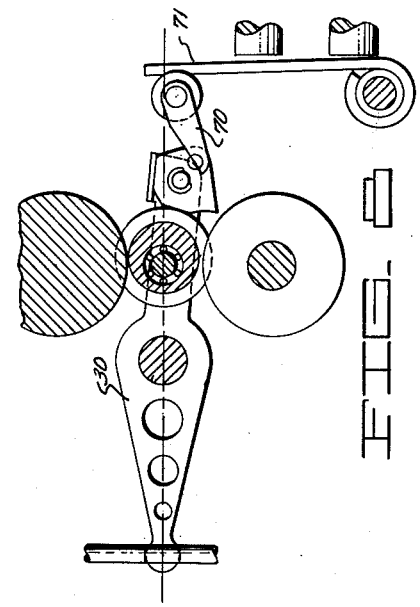
FIG. 5 is an end view similar to FIG. 3 but illustrating part of the actuator unit of FIG. 4.

Referring to the drawings, the punch unit is illustrated as capable of perforating eight channels and accordingly eight data punches 11 and one sprocket feed perforation punch 12 are provided, each being selectively reciprocable by a respective actuator unit generally indicated at 13. It should be understood, however, that the punch may be readily expanded to incorporate any desired number of punches and their actuator units.

The punch unit comprises, in general, two spaced side plates 14 and 15. End plates 16 and 17 extend across the side plates, and the bottom of the unit is enclosed by a bottom plate 18. A tape guiding table is formed by the top wall 20 of a casting 21 suitably secured at opposite sides to the plates 14 and 15. The wall 20 extends contiguous with top plates 22 and 23 to form an oil tight compartment enclosing the major operating parts of the punch unit.

Paper tape is fed from a suitable supply roll (not shown), over the guide table and under a die plate 24 by a sprocket 25 which is provided with teeth engageable with feed perforation holes perforated by the punch 12. The tape is subsequently guided under and around a guide shoe 26 and on to a suitable take-up roll (not shown).

The punches 11 and 12 are guided for endwise vertical movement toward and away from die openings in the plate 24 by bearings formed in the top wall 20 and in a bottom wall 27 of the casting. The latter wall is in the form of an inverted U having its lower ends attached to the bottom cover 18 to enclose an opening 28 in the latter.

The actuator units 13 are alternately located on opposite sides of the punches to provide sufficient lateral room for operation.

Each of the actuator units 13 comprises a lever 30 pivoted on a shaft, i.e., 31, and pivotally connected to a respective punch by means of a rounded head 132 which fits within a slot in the punch. The lever rotatably supports an eccentric roller 32 adjacent the opposite end thereof. Such roller has a V-shaped groove 33 (FIG. 3) formed around the periphery thereof. The roller is arranged to be frictionally driven by two continuously driven rolls 34 and 35 located on diametrically opposite sides of the aligned eccentric rollers.

The lower drive roll 34 is mounted on a shaft 36 rotatably supported in bearings carried by the side plates 14 and 15. For each eccentric roller 33, there is fixed on the shaft a disc 37 and two flanges 38 and 40. The latter are spaced slightly from each other by a spacer 41 and are of a resilient material, preferably plastic, having conically shaped peripheries arranged to frictionally engage the sides of the groove 33 in the respective eccentric roller whereby to rotate the same. Such construction allows a certain amount of lateral flexing of the flanges and maintains the flanges in continuous frictional engagement with the eccentric roller at all times. The disc 37 is adapted to be engaged by a portion 42 of the periphery of the aligned eccentric roller.

The upper roll 35 is rotatably mounted in bearings carried by the side plates 14 and 15 and has a series of concentric flanges 43 thereon, one for each eccentric roller 32. Each flange is conically shaped on each side, the angle *a* formed by each side being substantially the same as a corresponding angle formed by the mating side of the groove 33.

The rolls 34 and 35 are driven in the same direction, as indicated by the arrows A and B, and for this purpose gears 44 and 45 are fixed to such rolls and mesh with a gear 46 rotatably supported by bearings carried by the shaft 31. The latter gear is entrained with gears 47 and 48, the latter gear being carried by a shaft 50 rotatable in bearings 51 carried by the side plate 14. Shaft 50 is attached to a pulley 52 which is driven through a belt 53 by a pulley 54 driven by a continuously driven motor 55.

Rolls 56 and 57, similar to the rolls 34 and 35, for operating the actuator units located on the side of the punches opposite from those just described, are driven by gears 58 and 60, respectively, entrained with the drive gear 48 through an idler gear 61.

Describing now the means for braking the eccentric rollers and for releasing the same to operate their respective punches, each lever 30 carries a brake piece 62 pivoted thereto at 63 (see also FIGS. 6 to 9). The piece has an arcuate surface 64 thereon engageable with the surface 42 on its eccentric roller and a surface 65 engageable with an ear 66 on its lever 30.

Figure 6:
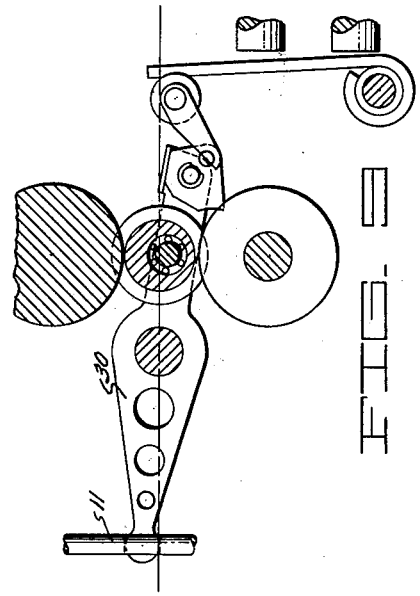

Referring particularly to FIG. 6 which illustrates an actuator unit in its home position of rest, it will be noted that the roll 34 tends to rotate the eccentric roller 32 counterclockwise but is prevented from doing so by engagement of the brake piece 62 with the periphery of the eccentric roller 32. In this condition, the center *c* of the periphery of the roller is located directly below the center *d* of its pivotal support. Also, when the parts are in their positions illustrated in FIG. 6, the upper edge of the arcuate surface 64 preferably terminates on a line *e* passing between the center *c* and the center of the pivot 63. However, such edge may be located slightly above the line *e*.

The resultant force urges the lever 30 counterclockwise to press the punch 11 downward against an adjustable stop screw 67 carried by a bridge piece 68 suitably secured at opposite ends in the side plates 14 and 15. Spring means to be described later urge the lever in a counterclockwise direction.

The stop screw 67 is preferably adjusted so that in the home position of the actuating unit, the roller 32 just clears the upper roll 35.

The brake piece 62 is pivotally connected through a link 70 to the upper end of an armature 71 of an electromagnet 72 carried by the end plate 17. The armature is fulcrumed on a cross rod 73 mounted on the side plates 14 and 15 and is located adjacent a U-shaped core 171 of the magnet.

Figure 7:
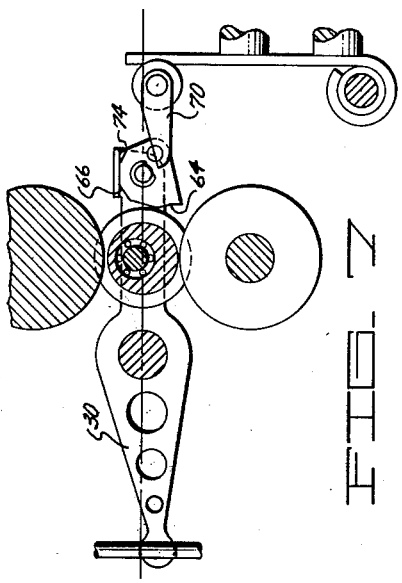

Upon energizing the electromagnet, the armature will be attracted thereto, causing the link 70 to rock the brake piece 62 counterclockwise into its position shown in FIG. 7 wherein a surface 74 on the latter engages the undersurface of the ear 66. As the braking surface 64 recedes from the eccentric roller 32, the roll 34 becomes effective to rotate the same.

Now, both rolls 34 and 35 will be effective to frictionally drive the roller 32, causing the center *d* to move below its center *c* so as to oscillate the lever 30 and thus move the punch 11 through its punching stroke.

Figure 8:
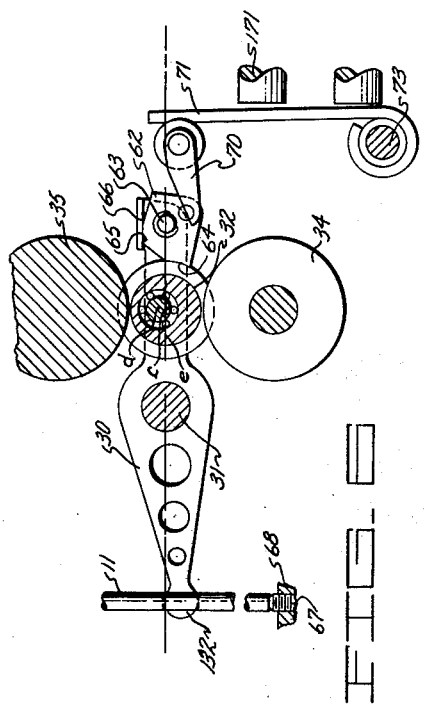

FIG. 8 shows the actuator unit in a position in which the eccentric roller has advanced 90° from its normal home position. It will be noted that as the lever 30 rocks clockwise, the brake piece 62 will be carried with it as a rigid extension causing the link 70 to be drawn to the left to forceably move the armature 71 to the left, thereby causing the latter to break away from any possible residual magnetic forces remaining in the magnetic material of the magnet core 171. It should be noted at this point that the armature is limited in its leftward movement by an adjustable stop screw 106 (FIG. 1).

FIG. 9 illustrates the actuator unit in a position in which the eccentric roller has advanced 180° from its home position. In such position the punch 11 will have reached the upper limit of its stroke and will have perforated the tape.

Subsequent to withdrawal of the armature 71 from its electromagnet and as the eccentric roller moves toward its home position, the armature will be held in its withdrawn position by a leaf spring 75 which acts against the armature 71 through a plunger 76 slideably mounted in a guide 77 carried by the end plate 17.

As the eccentric roller 32 reaches its home position, the parts will re-assume their positions shown in FIG. 6 wherein the braking surface 64 of the brake piece 62 will engage the roller 32 to arrest the same.

Under extremely high speeds of operation, the forces developed in oscillating the lever 30, even though of a gradually accelerated nature, will tend to unduly jam the eccentric roller 32 against the resilient drive flanges 38 and 40 of the roll 34. In such case, the periphery of the eccentric roller engages the periphery of the disc 37 to thus limit such jamming tendency.

Parity check contacts generally indicated at 80 are operated by respective ones of the punches 11. For this purpose, a slide 81 is attached at its upper end to a respective punch 11 and has one or more shoulders 82 formed thereon and extending between adjacent ends of spaced contact blades 83 and 84 which are attached at their opposite ends in an anchor block assembly 85 mounted between the side plates 14 and 15. The blades 83 and 84 carry electrical contacts which are arranged to alternately engage contacts carried by a center blade 86, also supported by the anchor block assembly 85, when the lever 30 is oscillated.

A leaf spring 87 also carried by the anchor block assembly 85 presses downwardly on the slide 81 to urge its respective punch 11 downward toward contact with its stop screw 67.

The tape feed sprocket 25 is intermittently advanced as an incident to a data punch operation by an actuator unit (FIGS. 4 and 5) somewhat similar to the actuator unit 13. For this purpose, a lever 88 is pivoted on the shaft 31, and carries an eccentric roller 31*a* and brake piece 62*a*, similar to roller 31 and brake piece 62. However, the portion of the roll 34 effective to drive the eccentric roller 31*a* is somewhat different as shown in FIG. 5 and comprises resilient flanges 38*a* and 40*a* which are attached to the shaft 36 and are spaced apart sufficiently to frictionally engage the end faces of the eccentric roller 31*a*. A metal disc 90 is fastened to the shaft 36 intermediate the flanges 38*a* and 40*a*, which disc is beveled radially to fit the sides of the peripheral groove in the eccentric roller. Such construction obviates the lateral flexing as the radial load increases (as occurs in the flanges 38 and 40 of FIG. 3) and thereby allows the frictional driving forces to adjust to the load imposed by the tape feed mechanism.

It should be noted that the circuits for the electromagnets 72 are preferably so arranged that the electromagnet for the tape feed sprocket perforation punch 12 is energized concurrently with energization of one or more of the data punches and that the tape is advanced one increment as an incident to this operation. For this purpose, the hub 91 of the lever 30 operatively connected to the sprocket feed perforation punch 12 is attached by a pin 92 (FIG. 2) to the shaft 31. Also attached to such shaft is an arm 93 carrying a roller 94 which is engageable with a pin 95 carried by a brake piece 62*a*. Accordingly, upon operation of the punch 12, the shaft 31 will be rocked causing arm 93, through roller 94, to trip the brake piece 62*a* and thereby enable the eccentric roller 31*a* to oscillate the lever 88. The latter is connected through a link 96 to a rotatable member 97 mounted on a shaft 98 which also supports the tape advancing sprocket 25 (FIG. 1).

As described in detail in the co-pending application of J. H. Drillick, Serial No. 102,451, filed April 12, 1961, suitable means are provided to transfer an incremental advance to the tape sprocket 25 during each oscillation of member 97 by the lever 88.

In order to lubricate the operating parts, pads 105 of felt or similar material are mounted below and in wiping engagement with the rolls 34 and 56. Such pads are impregnated with oil which is carried as a film to the various rollers and other operating parts.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to secure by United States Letters Patent is:

1. In a selectively operable power transmission device, the combination comprising an actuating member, an eccentric roller, means rotatably mounting said roller on said actuating member, a rotatable drive roll in rolling frictional engagement with said roller, said roll being adapted to rotate said roller whereby to operate said actuating member, a brake engageable with the eccentric surface of said roller whereby to prevent rotation of said roller, and means for selectively releasing said brake from said roller.

2. In a selectively operable power transmission device, the combination comprising an oscillatable actuating member, an eccentric roller, means rotatably mounting said roller on said actuating member, a pair of rotatable drive rolls in rolling frictional engagement on opposite sides of said roller, said rolls being adapted to frictionally drive said roller through a complete revolution whereby to oscillate said actuating member, brake means engageable with the eccentric surface of said roller whereby to arrest said roller, and means for selectively releasing said last mentioned means.

3. In a selectively operable power transmission device, the combinaiton comprising an actuating member, an eccentric roller, a pivotal mounting for said roller operatively connected to said actuating member, a drive roll adapted to frictionally drive said roller whereby to operate said actuating member, a brake carried by said actuating member and engageable by said roller for normally preventing rotation of said roller, and means for selectively releasing said brake.

4. In a selectively operable power transmission device, the combination comprising an oscillatable actuating member, a roller, means eccentrically mounting said roller on said actuating member, a pair of rotatable drive rolls located around the periphery of said roller and adapted to frictionally drive said roller whereby to oscillate said actuating member, a blocking device normally blocking said roller from rotation, said blocking device normally maintaining said roller in frictional engagement with one of said drive rolls, and means for selectively releasing said last mentioned means.

5. In a selectively operable power transmission device, the combination comprising an actuating member, an eccentric roller on said member, a pair of rotatable drive rolls spaced around the periphery of said roller, said rolls being adapted to frictionally drive said roller through a revolution whereby to move said actuating member back and forth through an operating stroke, one of said rolls being normally in frictional engagement with said eccentric roller, a brake engageable with the periphery of said roller for preventing said roller from rotating and for maintaining said actuating member in an initial position, and means for selectively removing said brake from engagement with said roller.

6. In a selectively operable power transmission device, the combination comprising an actuating member, an eccentric roller rotatably carried by said actuating member, said roller having a groove around the periphery thereof, a rotatable drive roll adapted to frictionally drive said roller whereby to operate said actuating member, said roll having a pair of resilient flanges engaging the sides of said groove, means normally preventing rotation of said roller, and means for selectively releasing said last mentioned means.

7. In a selectively operable power transmission device, the combination comprising an actuating member, an eccentric roller rotatably carried by said actuating member, said roller having a substantially V-shaped groove around the periphery thereof, a rotatable drive roll adapted to frictionally drive said roller whereby to operate said actuating member, said roll having a pair of substantially conically shaped resilient flanges engaging the sides of said groove, said flanges yieldably pressing outwardly whereby to frictionally engage the sides of said groove.

8. In a power transmission device, the combination comprising an actuating member, an eccentric roller rotatably carried by said actuating member, said roller having a cylindrical portion and a substantially V-shaped groove around the periphery thereof and concentric with said cylindrical portion, a rotatable drive roll adapted to frictionally drive said roller whereby to operate said actuating member, said roll having a pair of substantially conically shaped resilient flanges engaging the sides of said groove, said flanges yieldably pressing outwardly whereby to frictionally engage the sides of said groove, said roll having a cylindrical portion concentric with said flanges and engageable by said cylindrical portion of said roller, and means for urging said roller toward said roll.

9. In a selectively operable power transmission device, the combination comprising an oscillatable actuating member, an eccentric roller rotatably carried by said member, a pair of rotatable drive rolls on at least substantially diametrically opposite sides of said roller and adapted to frictionally drive said roller whereby to oscillate said actuating member, means normally preventing rotation of said roller, said last mentioned means maintaining said actuating member in an initial position, and means for preventing frictional engagement between said roller and one of said drive rolls when said actuating member is in said initial position.

10. In a selectively operable power transmission device, the combination comprising an actuating member, an eccentric roller, means rotatably mounting said roller on said actuating member, a drive roll adapted to frictionally dirve said roller whereby to operate said actuating member, a brake carried by said actuating member for normally preventing rotation of said roller by said roll, an armature operatively connected to said brake, and an electromagnet adapted to attract said armature whereby to release said brake, said actuating member being effective upon operation to withdraw said armature from said electromagnet.

11. In a selectively operable perforator, the combination comprising a die, a punch cooperable with said die for perforating a record medium therebetween, means for guiding said punch through a perforating stroke, an eccentric roller, a pivotal mounting for said roller operatively connected to said punch, a pair of rotatable drive rolls spaced around the periphery of said roller and adapted to frictionally drive said roller whereby to move said punch through said perforating stroke, means normally preventing rotation of said roller, and means for selectively releasing said last mentioned means.

12. In a selectively operable perforator, the combination comprising a die, a punch cooperable with said die for perforating a record medium therebetween, means for guiding said punch through a perforating stroke, an eccentric roller, means rotatably mounting said roller, said last mentioned means being operatively connected to said punch, a pair of rotatable drive rolls spaced around the periphery of said roller, said rolls being adapted to frictionally drive said roller through a revolution whereby to move said punch through said stroke, a brake engageable with the periphery of said roller for preventing said roller from rotating and for maintaining said punch withdrawn from said die, and means for selectively removing said brake from engagement with said roller.

13. In a selectively operable perforator, the combination comprising a die, a plurality of punches cooperable with said die for perforating a tape therebetween, means for guiding said punches through perforating strokes, a pair of spaced rotatable drive rolls, a plurality of levers operatively connected to respective ones of said punches, means for pivotally supporting said levers independently of each other, a plurality of rollers intermediate said rolls and eccentrically supported by respective ones of said levers, said rolls being adapted to frictionally drive said rollers whereby to move respective ones of said punches through their perforating strokes, brake members engageable with the peripheries of respective ones of said rollers for preventing said rollers from rotating and for maintaining said punches withdrawn from said die, and means for releasing selected ones of said brakes.

14. In a selectively operable power transmission device, the combination comprising an oscillatable actuating member, a roller, means eccentrically mounting said roller on said actuating member, a pair of rotatable drive rolls located at least at substantially diametrically opposite positions relative to said roller and adapted to drive said roller in rolling frictional engagement with the periphery thereof whereby to oscillate said actuating member, a brake member engageable with the eccentric surface of said roller for normally preventing rotation of said roller, electromagnetic means for moving said brake member to release said roll, and means including said actuating member for returning said brake member to engage said roller.

References Cited in the file of this patent
UNITED STATES PATENTS

| | | |
|---|---|---|
| 1,827,693 | Van Reppert | Oct. 13, 1931 |
| 1,940,156 | Thompson et al. | Dec. 19, 1933 |
| 2,189,027 | Fuller | Feb. 6, 1940 |
| 2,627,414 | Sear | Feb. 3, 1953 |
| 3,064,882 | Levin | Nov. 20, 1962 |
| 3,068,985 | Arthur | Dec. 18, 1962 |